US012607811B2

(12) United States Patent
Suzuki et al.

(10) Patent No.: US 12,607,811 B2
(45) Date of Patent: Apr. 21, 2026

(54) OPTICAL MODULE

(71) Applicant: NITTO DENKO CORPORATION, Ibaraki (JP)

(72) Inventors: Kazuaki Suzuki, Ibaraki (JP); Naoto Konegawa, Ibaraki (JP); Tadao Okawa, Ibaraki (JP); Koji Ichinose, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 92 days.

(21) Appl. No.: 18/011,238

(22) PCT Filed: Jun. 30, 2021

(86) PCT No.: PCT/JP2021/024696
§ 371 (c)(1),
(2) Date: Dec. 19, 2022

(87) PCT Pub. No.: WO2022/004772
PCT Pub. Date: Jan. 6, 2022

(65) Prior Publication Data
US 2023/0251437 A1 Aug. 10, 2023

(30) Foreign Application Priority Data

Jul. 1, 2020 (JP) ................................. 2020-113857

(51) Int. Cl.
*G02B 6/42* (2006.01)

(52) U.S. Cl.
CPC ........... *G02B 6/4212* (2013.01); *G02B 6/428* (2013.01)

(58) Field of Classification Search
CPC .... G02B 6/4212; G02B 6/4214; G02B 6/428; H01L 31/02; H01S 5/02234; H01S 5/02255
See application file for complete search history.

(56) References Cited

U.S. PATENT DOCUMENTS 6,661,939 B2 12/2003 Kaneko et al.
7,065,275 B2 * 6/2006 Miyamae ............. G02B 6/4283
385/88

(Continued)

FOREIGN PATENT DOCUMENTS

CN 105026456 A 11/2015
JP 2004-004426 A 1/2004
(Continued)

OTHER PUBLICATIONS

Notification of Transmittal of Translation of the International Preliminary Report on Patentabililty (Form PCT/IB/338) issued in counterpart International Application No. PCT/JP2021/024696 mailed Jan. 12, 2023 with Forms PCT/IB/373 and PCT/ISA/237. (6 pages).
(Continued)

*Primary Examiner* — Jennifer D. Carruth
(74) *Attorney, Agent, or Firm* — WHDA, LLP

(57) ABSTRACT

An optical module includes: an electric circuit board E including an electric circuit provided on a light-permeable resin substrate 1; and an optical element 11 joined onto the electric circuit board E. The optical element 11 is joined to the electric circuit board E, with a light-emitting portion (or light-receiving portion) 11a of the optical element 11 facing an electric circuit surface side of the electric circuit board E. A space between the light-emitting portion (or light-receiving portion) 11a of the optical element 11 and the light-permeable resin substrate 1 is filled with a light-permeable resin cured material X. A relative refractive index difference between the light-permeable resin cured material X and the light-permeable resin substrate 1 is not greater than 20%. This reduces the propagation loss of light with a simple structure.

6 Claims, 3 Drawing Sheets

(56)     References Cited

U.S. PATENT DOCUMENTS

| | | |
|---|---|---|
| 7,919,849 B2 | 4/2011 | Kodama et al. |
| 9,054,812 B2 | 6/2015 | Yagisawa et al. |
| 2002/0037138 A1 | 3/2002 | Kaneko et al. |
| 2004/0266062 A1 | 12/2004 | Lu et al. |
| 2005/0008302 A1 | 1/2005 | Miyamae |
| 2006/0012967 A1 | 1/2006 | Asai et al. |
| 2006/0171627 A1 | 8/2006 | Aoki et al. |
| 2009/0180732 A1 | 7/2009 | Takai et al. |
| 2011/0080657 A1 | 4/2011 | Takai et al. |
| 2019/0064455 A1 | 2/2019 | Mori et al. |
| 2021/0294050 A1 | 9/2021 | Konegawa |
| 2022/0179160 A1 | 6/2022 | Konegawa et al. |

FOREIGN PATENT DOCUMENTS

| | | | |
|---|---|---|---|
| JP | 2005/202382 A | | 7/2005 |
| JP | 2009-3265 A | | 1/2009 |
| JP | 2009-163178 A | | 7/2009 |
| JP | 2011-81071 A | | 4/2011 |
| JP | 2012/078609 A | | 4/2012 |
| JP | 2013-088678 A | | 5/2013 |
| JP | 2013219205 A | * | 10/2013 |
| JP | 2015-22128 A | | 2/2015 |
| JP | 2019-40011 A | | 3/2019 |
| JP | 2020-16757 A | | 1/2020 |
| JP | 2020-166107 A | | 10/2020 |
| TW | I623576 B | | 5/2018 |

OTHER PUBLICATIONS

International Search Report dated Sep. 14, 2021, issued in counterpart International Application No. PCT/JP2021/024696, w/English translation (5 pages).

Office Action dated Feb. 4, 2025, issued in counterpart JP Application No. 2022-534072, with English translation. (6 pages).

Decision of Refusal dated Jun. 3, 2025, issued in counterpart TW Application No. 110123938, with English translation. (10 pages).

Office Action dated Jun. 24, 2025, issued in counterpart JP Application No. 2022-534072, with English translation. (6 pages).

Office Action dated Jan. 3, 2025, issued in counterpart TW Application No. 110123938, with English translation. (11 pages).

Office Action dated Jul. 26, 2025, issued in counterpart CN Application No. 202180038392.9, with English translation (17 pages).

Office Action dated Oct. 30, 2025, issued in counterpart TW Application No. 110123938, with English translation. (13 pages).

Office Action dated Feb. 4, 2026, issued in counterpart CN Application No. 202180038392.9, with English translation (17 pages).

Office Action dated Feb. 23, 2026, issued in counterpart TW Application No. 110123938, with English translation. (14 pages).

* cited by examiner

RELATED ART

OPTICAL MODULE

TECHNICAL FIELD

The present disclosure relates to an optical module in
which an optical element such as a light-emitting or light-
receiving element is mounted on an electric circuit board (or
an optical element and an electric circuit board are joined
together).

BACKGROUND ART

For example, an opto-electric hybrid board (a first related
art example) to be described below has been proposed as an
optical module in which an optical element such as a
light-emitting or light-receiving element is mounted on an
optical waveguide. This opto-electric hybrid board includes:
an electric circuit board with an electrical interconnect line
formed on a front surface of an insulative layer; an optical
waveguide [a first cladding layer, a core (an optical interconnect line), and a second cladding layer] stacked on a back
surface (a surface on the opposite side from a surface on
which the electrical interconnect line is formed) of the
aforementioned insulative layer of the electric circuit board;
and light-emitting and light-receiving elements mounted on
portions of the surface on which the electrical interconnect
line is formed, the portions corresponding to both end
portions of the aforementioned optical waveguide. In this
opto-electric hybrid board, the both end portions of the
optical waveguide are in the form of inclined surfaces
inclined at 45 degrees with respect to the longitudinal
direction of the aforementioned core (a direction in which
light propagates). Portions of the core which are positioned
at the inclined surfaces function as light reflecting surfaces
(mirrors). The insulative layer is permeable to light to allow
light to propagate therethrough between the light-emitting
element and a light reflecting surface provided in a first end
portion and between the light-receiving element and a light
reflecting surface provided in a second end portion.

The propagation of light in the aforementioned opto-electric hybrid board is performed in a manner to be
described below. First, light is emitted from the light-
emitting element toward the light reflecting surface in the
first end portion. The light passes through the insulative
layer, and then passes through the first cladding layer in the
first end portion of the optical waveguide. Then, the light is
reflected from the light reflecting surface in the first end
portion of the core (or the optical path is changed by 90
degrees), and travels through the interior of the core in the
longitudinal direction thereof. Then, the light propagated in
the core is reflected from the light reflecting surface in the
second end portion of the core (or the optical path is changed
by 90 degrees), and travels toward the light-receiving ele-
ment. Subsequently, the light passes through and exits from
the first cladding layer in the second end portion. Then, the
light passes through the insulative layer, and is received by
the light-receiving element.

However, by the time the light emitted from the afore-
mentioned light-emitting element reaches the light-receiving
element, the amount of effectively propagated light is
reduced due to the diffusion or reflection of the aforemen-
tioned light. This results in a problem of a decrease in output
from the opto-electric hybrid board.

To solve such a problem, various techniques have been
proposed, for example, in which a lens is provided between
the optical element such as the light-emitting or light-
receiving element and the optical waveguide in a configuration shown in the aforementioned first related art example
to reduce the propagation loss of light (a second related art
example) (see PTL 1, for example).

RELATED ART DOCUMENT

Patent Document

PTL 1: JP-A-2019-40011

SUMMARY

However, the techniques in which the lens is provided as
in the second related art example result in a complicated
structure, a large number of parts, and a complicated manu-
facturing process to present a problem in terms of costs, and
hence have room for improvement in these respects.

In view of the foregoing, the present disclosure provides
an optical module capable of reducing the propagation loss
of light with a simple structure.

The present inventors have diligently made studies to
solve the aforementioned problems. In the course of their
studies, the present inventors have considered the use of a
light-permeable resin composition as an underfill for an
optical element such as a light-emitting or light-receiving
element in the configuration shown in the aforementioned
first related art example. Specifically, the present inventors
have considered simplifying a structure and a manufacturing
process for reduction in the propagation loss of light by
underfilling with the light-permeable resin composition, and
further producing the effect of reinforcing a junction
between the optical element and the electric circuit board by
the aforementioned underfilling.

For example, in the aforementioned first related art
example, as shown in FIG. 4, there is a gap portion (space
filled with air) 20 between a light-emitting portion (or
light-receiving portion) 11a of an optical element 11 and an
insulative layer (light-permeable resin substrate 1) of an
electric circuit board E. Because of the large difference
between the refractive index of air and the refractive index
of the light-permeable resin substrate 1, part of an optical
signal L is reflected at an interface between the gap portion
20 and the light-permeable resin substrate 1, as indicated by
the hollow arrows in FIG. 4, resulting in a large light
propagation loss.

To solve such a problem, the present inventors have
considered filling the gap portion 20 with a light-permeable
resin cured material X, as shown in FIG. 2, and further
decreasing the difference between the refractive index of the
light-permeable resin cured material X and the refractive
index of the light-permeable resin substrate 1 of the electric
circuit board E thereby to suppress the light propagation
loss. In addition, the present inventors have determined that,
when a relative refractive index difference represented by
Equation (1) below is calculated and the value thereof is not
greater than 20%, the reflection of the optical signal L at an
interface between the light-permeable resin cured material X
and the light-permeable resin substrate 1, as shown in FIG.
2, is less than the reflection of the optical signal L at the
interface between the gap portion 20 and the light-permeable
resin substrate 1 as shown in FIG. 4, which in turn reduces
the light propagation loss to thereby improve the output
efficiency of the optical signal L propagating in a core 7
when an optical waveguide W is provided, as shown in
FIGS. 2 and 4, for example.

$$\text{Relative refractive index difference[\%]} = [(n1-n2)/n1] \times 100 \tag{1}$$

where n1 is the higher one of the refractive index of the light-permeable resin cured material X and the refractive index of the light-permeable resin substrate 1 of the electric circuit board E, and n2 is the lower one thereof.

The present disclosure include the following aspects [1] to [5].

[1] An optical module comprising: an electric circuit board including an electric circuit provided on a light-permeable resin substrate; and an optical element joined onto the electric circuit board, wherein the optical element is joined to the electric circuit board, with a light-emitting or light-receiving portion of the optical element facing an electric circuit surface side of the electric circuit board, wherein a space between the light-emitting or light-receiving portion of the optical element and the light-permeable resin substrate is filled with a light-permeable resin cured material, and wherein a relative refractive index difference between the light-permeable resin cured material and the light-permeable resin substrate is not greater than 20%.

[2] The optical module according to [1], wherein the light-permeable resin cured material has a 400-nm light permeability of not less than 40% when the thickness thereof is 100 μm.

[3] The optical module according to [1] or [2], wherein the light-permeable resin cured material is made of a cured material of a thermosetting resin composition which is cured by heating at 100° C. for 3 hours.

[4] The optical module according to any one of [1] to [3], wherein the light-permeable resin substrate is made of a polyimide resin.

[5] The optical module according to any one of [1] to [4], wherein an optical waveguide is provided on a surface of the electric circuit board opposite from a surface thereof to which the optical element is joined, and has a core optically coupled to the light-emitting or light-receiving portion of the optical element.

In accordance with the above, the optical module of the present disclosure is capable of reducing the propagation loss of light with a simple structure to thereby improve light extraction efficiency (output efficiency of the optical module). In addition, the optical module of the present disclosure is excellent in durability because a junction location between the electric circuit board and the optical element is reinforced by the underfill.

DESCRIPTION OF EMBODIMENTS

Next, an embodiment of the present disclosure will now be described in detail. However, the present disclosure is not limited to this embodiment.

An optical module according to the present disclosure is an optical module including: an electric circuit board including an electric circuit provided on a light-permeable resin substrate; and an optical element joined onto the electric circuit board. The optical element is joined to the electric circuit board, with a light-emitting or light-receiving portion of the optical element facing an electric circuit surface side of the electric circuit board. A space between the light-emitting or light-receiving portion of the optical element and the light-permeable resin substrate is filled with a light-permeable resin cured material. A feature is that a relative refractive index difference between the light-permeable resin cured material and the light-permeable resin substrate (a relative refractive index difference (%) represented by Equation (1) below) is not greater than 20%. In the present disclosure, "light-permeable" in the aforementioned light-permeable resin substrate means that the light permeability thereof to a wavelength of 850 nm is not less than 60%, preferably not less than 65%, and more preferably not less than 70%.

Also, "light-permeable" in the aforementioned light-permeable resin cured material means that the light permeability thereof to a wavelength of 400 nm is not less than 40%, preferably not less than 60%, and more preferably not less than 80%, when the light-permeable resin cured material has a thickness of 100 μm.

The aforementioned light permeability is measurable, for example, by a UV-Vis-NIR spectrophotometer "JASCO V-670" available from JASCO Corporation.

Figure 1:
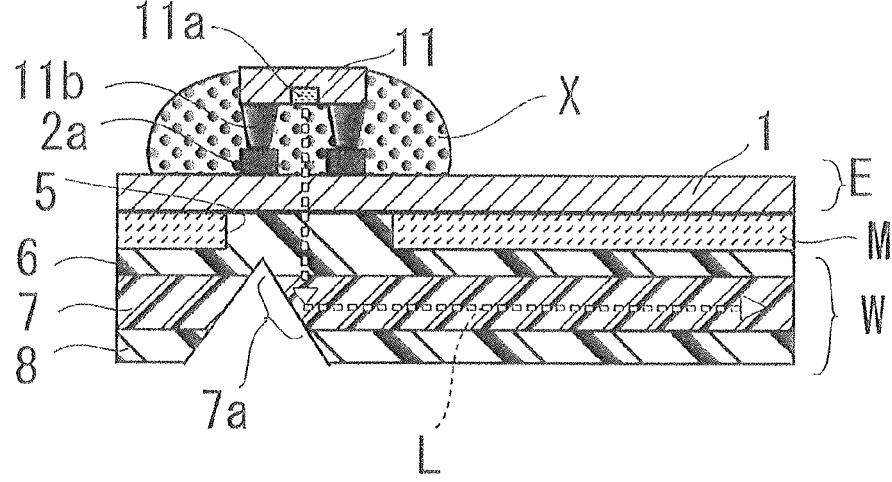
FIG. 1 is a vertical sectional view schematically showing an example of an optical module according to the present disclosure.
Figure 2:
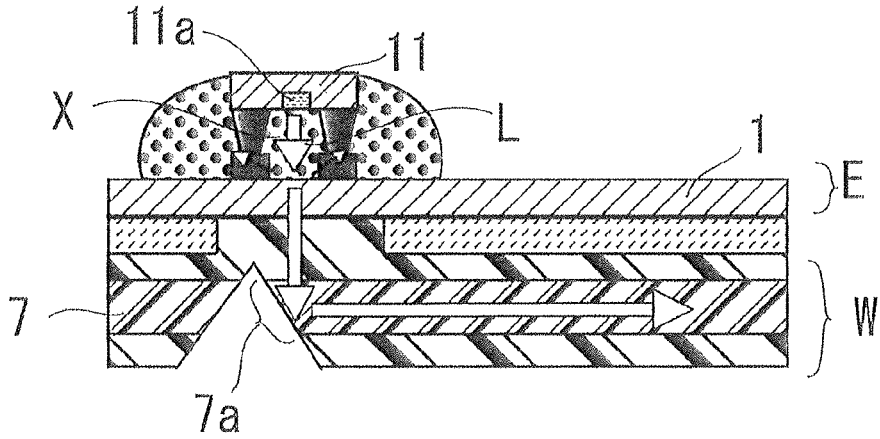
FIG. 2 is a vertical sectional view schematically showing a flow of an optical signal in the aforementioned optical module.

FIG. 1 shows an example of the optical module of the present disclosure. The reference numeral 11 designates an optical element; the reference character 112 designates a light-emitting portion (or light-receiving portion); and 11b designates a bump. As shown, the optical element 11 is mounted so as to be connected to the electric circuit of the electric circuit board E via the bump 11b and a mounting pad 2a, with the light-emitting portion (or light-receiving portion) 11a thereof facing the electric circuit board E side. The electric circuit board E is configured such that the electric circuit (not shown) and the mounting pad 2a are formed on a front surface of the light-permeable resin substrate 1.

The optical module of the present disclosure as shown in FIG. 1, is an opto-electric hybrid board including an optical waveguide W on a surface of the electric circuit board E opposite from a surface thereof to which the optical element 11 is joined. The optical waveguide W has a core 7 optically coupled to the light-emitting portion (or light-receiving portion) 11a of the optical element 11 through the light-permeable resin cured material X and the light-permeable resin substrate 1. The optical waveguide W includes a first cladding layer 6, the core 7, and a second cladding layer 8 which are laminated together. As shown, a first end portion of the optical waveguide W which corresponds to the optical element 11 is formed into an inclined surface inclined at 45 degrees with respect to a longitudinal direction of the core 7. A portion of the core 7 which is positioned at the inclined surface functions as a light reflecting surface 7a. With such a configuration, the light-emitting portion (or light-receiving portion) 11a of the optical element 11 and the core 7 are optically coupled to each other. When 11a designates the light-emitting portion, an optical signal L propagates in the core 7 of the optical waveguide W in a direction indicated by an arrow shown in FIG. 1. When 11a designates the light-receiving portion, the optical signal L propagates in a direction opposite the direction indicated by the arrow shown in FIG. 1n this embodiment, a metal layer M for reinforcement is provided between the electric circuit board E and the optical waveguide W. The metal layer M includes a through hole 5 provided so as not to interfere with the optical signal L sent and received in the light-emitting portion (or light-receiving portion) 11a of the optical element 11. The first cladding layer 6 enters the through hole 5 so as to fill the through hole 5.

In the present disclosure, the space between the light-emitting portion (or light-receiving portion) 11a of the optical element 11 and the light-permeable resin substrate 1 of the electric circuit board E is filled with the light-permeable resin cured material X, as shown in FIG. 1. The relative refractive index difference between the light-permeable resin cured material X and the light-permeable resin substrate 1 is not greater than 20% as mentioned earlier. The aforementioned relative refractive index difference is preferably in the range of 0 to 15% and more preferably in the range of 0 to 10%. This improves light extraction efficiency (output efficiency of the optical module).

The aforementioned relative refractive index difference is a value represented by Equation (1) below.

$$\text{Relative refractive index difference}[\%]=[(n1-n2)/n1]\times100 \qquad (1)$$

where n1 is the higher one of the refractive index of the light-permeable resin cured material X and the refractive index of the light-permeable resin substrate 1 of the electric circuit board E, and n2 is the lower one thereof.

In the present disclosure, the aforementioned refractive indices are obtained by measuring the refractive indices for light of 850 nm by a prism coupler method, and are measurable, for example, by a 2010/M prism coupler available from Metricon Corporation.

The refractive index of the light-permeable resin cured material X is preferably in the range of 1.30 to 1.90 and more preferably in the range of 1.40 to 1.65. The refractive index of the light-permeable resin substrate 1 of the electric circuit board E is preferably in the range of 1.30 to 1.90 and more preferably in the range of 1.50 to 1.85.

Examples of a material for the formation of the light-permeable resin substrate 1 in the electric circuit board E include: synthetic resins such as polyimide, polyether nitrite, polyether sulfone, polyethylene terephthalate, polyethylene naphthalate, and polyvinyl chloride; and silicone sol-gel materials. These are used either alone or in combination. In particular, polyimide resin is preferable.

The light-permeable resin substrate 1 has a thickness preferably in the range of 5 to 100 μm from the viewpoint of light permeability and more preferably in the range of 10 to 30 μm from the same viewpoint.

A material for the formation of the light-permeable resin cured material X used herein generally has thermosetting or ultraviolet curable properties. In particular, a resin composition which is the aforementioned formation material preferably has both thermosetting and ultraviolet curable properties from the viewpoint of better manufacturing of the optical module of the present disclosure. The aforementioned properties are in general determined by the combination of a resin component (base compound component) and a curing agent component to be described later. The aforementioned resin composition is generally a liquid having fluidity at room temperature (25° C.) and is diluted with an organic solvent as necessary.

It is preferable that the light-permeable resin cured material X is made of a cured material of a thermosetting resin composition which is cured by heating at 100° C. for 3 hours from the viewpoint of suppressing failures of the optical element due to heating. From the same viewpoint, it is more preferable that the light-permeable resin cured material X is made of a cured material of a thermosetting resin composition which is cured by heating at 25 to 100° C. for 0.5 to 1 hour.

Examples of the resin component (base compound component) in the material for the formation of the light-permeable resin cured material X include light-permeable resins such as epoxy resins, silicone resins, acrylic resins, and urethane resins, which are used either alone or in combination. In particular, epoxy resins and silicone resins are preferably used from the viewpoint of heat resistance reliability.

Examples of the aforementioned epoxy resins include bisphenol epoxy resins, alicyclic epoxy resins, and novolac epoxy resins, which are used either alone or in combination. In particular, bisphenol epoxy resins and alicyclic epoxy resins are preferably used. Such epoxy resins used herein generally have an epoxy equivalent of 100 to 1000 and a softening point of 120° C. or less. It is preferable that the proportion of bisphenol and alicyclic epoxy resins is not less than 50% by weight of the total epoxy resins.

Examples of the aforementioned silicone resins include methyl silicones and phenyl silicones, which are used either alone or in combination. In particular, methyl silicones are preferably used.

Examples of the curing agent component for use with the aforementioned resin component include heat curing agents, ultraviolet curing agents (a photo-cation polymerization initiator, a photo-anion polymerization initiator, and a radical initiator), and moisture curing agents. These are used either alone or in combination.

Specific examples of the photo-cation polymerization initiator include triarylsulfonium phosphorus-based anion salts and triarylsulfonium borate salts. The amount of the aforementioned photo-cation polymerization initiator to be blended is preferably in the range of 0.1 to 10 parts by weight, more preferably in the range of 0.5 to 4 parts by weight, and further preferably in the range of 1 to 2 parts by weight, per 100 parts by weight of the resin component (base compound component).

The material for the formation of the light-permeable resin cured material X may additionally contain a curing catalyst, a dyestuff, a modifying agent, a discoloration inhibitor, an anti-aging agent, a mold release agent, a reactive or non-reactive diluent, and the like, as appropriate.

The resin composition which is the material for the formation of the light-permeable resin cured material X may be prepared, for example, by blending and mixing the aforementioned resin component, the curing agent component, and the like, and further by kneading and melt-mixing the same with a kneading machine, as necessary.

A method of underfilling the optical element 11 using the resin composition which is the material for the formation of the light-permeable resin cured material X is not particularly limited, but may be performed by known molding methods such as typical transfer molding and casting.

Figure 3A:
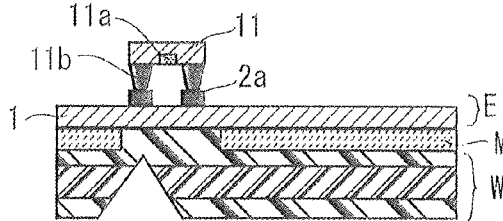
FIGS. 3A to 3D are illustrations schematically showing the steps of forming the optical module according to the present disclosure.
Figure 3B:
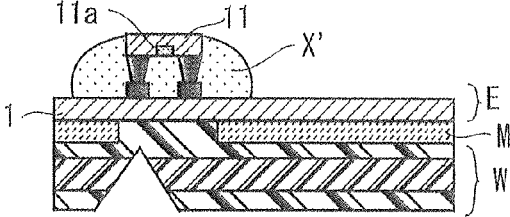
Figure 3C:
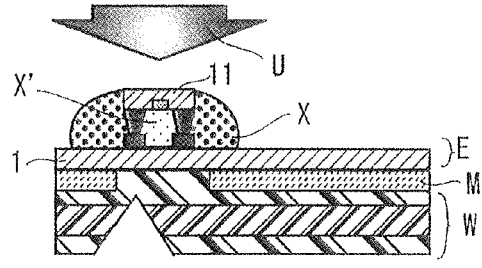
Figure 3D:
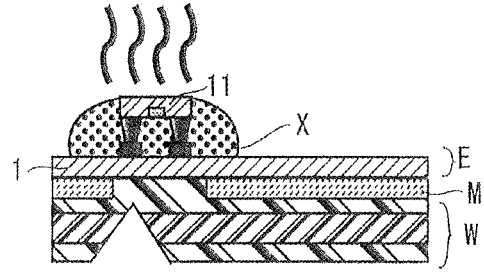

FIGS. 3A to 3D schematically show an example of the manufacturing process of the optical module of the present disclosure (the optical module shown in FIG. 1). The process proceeds in the order of FIGS. 3A to 3D, as shown. Specifically, as shown in FIG. 3A, the optical element 11 is mounted on the electric circuit board E. Thereafter, as shown in FIG. 3B, an underfill X' (the aforementioned resin composition) is applied. The aforementioned application is performed using a syringe or the like. Then, UV (ultraviolet light) is applied in a direction of an arrow U shown in FIG. 3C to partially cure the underfill X', thereby temporarily fixing the optical element 11. Thereafter, as shown in FIG.

3D, an uncured portion of the underfill X' (a portion not irradiated with UV) is thermally cured by heating. This provides a completely cured material (the light-permeable resin cured material X). The main fixing of the optical element 11 is performed in this manner.

UV irradiation conditions for UV curing of the aforementioned underfill X' are as follows: UV irradiation of 4,000 to 30,000 mJ/cm$^2$ is preferably performed by a UV irradiation apparatus; and UV irradiation of 12,000 to 24,000 J/m$^2$ is more preferably performed by the aforementioned apparatus. Heating conditions for thermally curing the underfill X' are as follows: preferably heating in an oven at 25 to 150° C. for 10 to 180 minutes; and more preferably heating in the aforementioned oven at 80 to 100° C. for 30 to 120 minutes.

In the manufacture of the optical module in the aforementioned steps, the underfill X' preferably has both thermosetting and ultraviolet curable properties.

Although the temporarily fixing step as mentioned above may be dispensed with, it is preferable that the temporarily fixing step as mentioned above is performed for yield improvement.

[Formation of Electric Circuit Board E]

For the formation of the electric circuit board E in FIG. 1, a metal sheet material for the formation of the metal layer M is initially prepared. Examples of a material for the formation of the metal sheet material include stainless steel and 42 alloy (an alloy of iron and nickel, wherein a content of the nickel is 42%). In particular, stainless steel is preferable from the viewpoint of dimensional accuracy and the like. The metal sheet material (the metal layer M) has a thickness set in the range of 10 to 100 μm, for example.

Next, a coating liquid made of the material for the formation of the light-permeable resin substrate 1 as mentioned earlier is applied to a front surface of the metal sheet material to form the light-permeable resin substrate 1 having a predetermined pattern by a photolithographic process.

Next, for example, an electrical interconnect line (not shown) and the mounting pad 2a are formed on the light-permeable resin substrate 1 by a semi-additive process or a subtractive process.

A photosensitive insulating resin including a polyimide resin or the like is generally applied to a portion of the aforementioned electrical interconnect line to form a coverlay by a photolithographic process. In this manner, the electric circuit board E is formed on the front surface of the metal sheet material.

Thereafter, etching or the like is performed on the metal sheet material to form the through hole 5 in the metal sheet material. In this manner, the metal sheet material is formed into the metal layer M.

[Formation of Optical Waveguide W]

For the formation of the optical waveguide W on a back surface of a laminate comprised of the electric circuit board E and the metal layer M as shown in FIG. 1, a photosensitive resin which is a material for the formation of the first cladding layer 6 is initially applied to the back surface (the lower surface as seen in the figure) of the laminate to form the first cladding layer 6 by a photolithographic process. This first cladding layer 6 is formed so as to fill the through hole 5 of the metal layer M, as shown in the figure. The first cladding layer 6 has a thickness (a thickness as measured from a back surface of the metal layer M) set, in the range of 5 to 80 μm, for example. The back surface of the laminate is positioned to face upward when the optical waveguide W is formed (when the aforementioned first cladding layer 6, the core 7 to be described later, and the second cladding layer 8 to be described later are formed).

Next, a photosensitive resin which is a material for the formation of the core 7 is applied to a front surface (a lower surface as seen in the figure) of the first cladding layer 6 to form the core 7 having a predetermined pattern by a photolithographic process. Thus, for example, the core 7 has the following dimensions: a width set in the range of 20 to 100 μm, a thickness set in the range of 20 to 100 μm, and a length set in the range of 0.5 to 100 cm.

Then, a material for the formation of the second cladding layer 8 is applied to the front surface (the lower surface as seen in the figure) of the first cladding layer 6 so as to cover the core 7 to form the second cladding layer 8 by a photolithographic process. The second cladding layer 8 has a thickness [a thickness as measured from an interface with the core 7] set in the range of 3 to 50 μm, for example. An example of the material for the formation of the second cladding layer 8 includes a photosensitive resin similar to that for the first cladding layer 8.

Thereafter, an inclined surface (the light reflecting surface 7a) inclined at 45 degrees with respect to the longitudinal direction of the core 7 is formed, for example, by laser machining in the optical waveguide W formed in the aforementioned manner. In this manner, the optical waveguide W is formed on the back surface of the metal layer M.

Each of the aforementioned photosensitive resins is prepared so that the refractive index of the core 7 is greater than those of the aforementioned first cladding layer 8 and the second cladding layer 8 to be described below.

The optical module of the present disclosure is usable as internal interconnect lines for electrical devices such as optical transceivers and AOCs (Active Optical Cables) based on optical communication interface standards such as QSFP (Quad Small Form-factor Pluggable) and OSFP (Octal Small Form Factor Pluggable), AOCs for consumer use, smartphones, tablets, and PCs (Personal Computers).

EXAMPLES

Next, examples will be described in conjunction with comparative examples. It should be noted that the present disclosure is not limited to these examples within the scope of the present disclosure.

The refractive indices described in the following examples and comparative examples were obtained by measuring the refractive indices for light of 850 nm by a prism coupler method using a 2010/M prism coupler available from Metricon Corporation. The values of the light permeability described in the following examples and comparative examples were those measured by a UV-Vis-NIR spectrophotometer "JASCO V-670" available from JASCO Corporation.

Example 1

Pre-mixed were 100 parts by weight of an epoxy resin (JER828 available from Mitsubishi Chemical Corporation) and 2 parts by weight of a photo-cation polymerization initiator (CPI-200K available from San-Agro Ltd.). Thereafter, the mixture was kneaded and melt-mixed in a kneading machine, and was then cooled to 23° C. In this manner, a light-permeable resin composition (underfill) was prepared which had a refractive index of 1.58 when cured into a cured material and which had a light permeability of 95% to a wavelength of 400 nm when the cured material thereof had a thickness of 100 μm.

A light-permeable resin substrate (a polyimide resin substrate including an optical element mounting portion having a thickness of 10 μm, a refractive index of 1.73, and a light permeability of 80% to a wavelength of 850 nm) was produced using a varnish. The varnish was prepared by mixing 4,4'-biphthalic anhydride (s-BPDA) as an acid anhydride, p-phenylenediamine (PDA) and 4,4'-diamino-2,2'-bis (trifluoromethyl)biphenyl (TFDB) as diamines, a photo-base generator, a reaction accelerator, a development accelerator, and a solvent together. The aforementioned refractive index was adjusted by adjusting the blending ratio between the acid anhydride and the diamines. Then, a flexible printed circuit board (electric circuit board) was obtained by forming an electric circuit on a front surface of the aforementioned light-permeable resin substrate.

A metal layer (a stainless steel (SUS) layer with a thickness of 20 μm) and an optical waveguide (an under cladding layer with a thickness of 30 μm (an area without SUS), and a core with a thickness of 40 μm and a width of 40 μm) were provided on a back surface of the aforementioned flexible printed circuit board, as shown in FIG. 1.

Thereafter, an optical element was fixed to the flexible printed circuit board (electric circuit board) on which the optical waveguide and the like were formed as mentioned above, using the aforementioned light-permeable resin composition (underfill) in the steps shown in FIGS. 3A to 3D. Specifically, a vertical cavity surface emitting laser (VC-SEL) chip (a light-emitting area with a diameter of 10 μm) as the optical element was initially mounted on a front surface of the aforementioned flexible printed circuit board (with reference to FIG. 3A). Thereafter, the prepared resin composition (underfill) was applied using a syringe (with reference to FIG. 3B). Next, UV (ultraviolet light) irradiation of 12,000 mJ/cm² was performed by a spot UV irradiation apparatus (SP-9 available from Ushio Inc.) to cure a UV-irradiated portion of the underfill, thereby temporarily fixing the optical element (with reference to FIG. 3C). Thereafter, the underfill was thermally cured by heating in an oven at 100° C. for 60 minutes. This provided a completely cured material (resin cured material for reinforcement of optical element coupling) to thereby mainly fix the optical element (with reference to FIG. 3D).

The underfill had a thickness of 36 μm, and a distance between a light reflecting surface (mirror) formed in the core of the optical waveguide and the optical element was 96 μm.

A sample of the optical module was produced in this manner.

Example 2

A resin composition (a silicone resin (adhesive agent) "LPS-3419" available from Shin-Etsu Chemical Co., Ltd.) which had a refractive index of 1.40 when cured into a cured material and which had a 400-nm light permeability of 95% when the cured material thereof had a thickness of 100 μm was used as the light-permeable resin composition (underfill).

Then, an optical module was manufactured in the same manner as in Example 1 except that the aforementioned light-permeable resin composition was used in place of the light-permeable resin composition (underfill) of Example 1, that the UV irradiation step was dispensed with, and that curing conditions were 150° C. and 60 minutes.

Example 3

In the composition of the light-permeable resin substrate of Example 1, a portion of s-BPDA was replaced with 4,4'-(hexafluoroisopropylidene)diphthalic anhydride (6FDA) and a portion of PDA was replaced with 2,2'-bis(4-aminocyclohexyl)-hexafluoropropane (6FDC), whereby a light-permeable resin substrate (a polyimide resin substrate including an optical element mounting portion having a thickness of 10 μm, a refractive index of 1.52, and a light permeability of 85% to a wavelength of 850 nm) was produced.

Then, an optical module was manufactured in the same manner as in Example 1 except that the aforementioned produced light-permeable resin substrate was used in place of the light-permeable resin substrate of Example 1.

Example 4

Pre-mixed were 100 parts by weight of an epoxy resin (YX8034 available from Mitsubishi Chemical Corporation) and 2 parts by weight of a photo-cation polymerization initiator (CPI-200K available from San-Apra Ltd.). Thereafter, the mixture was kneaded and melt-mixed in a kneading machine, and was then cooled to 23° C. In this manner, a light-permeable resin composition (underfill) was prepared which had a refractive index of 1.53 when cured into a cured material and which had a light permeability of 95% to a wavelength of 400 nm when the cured material thereof had a thickness of 100 μm.

In the composition of the light-permeable resin substrate of Example 1, a portion of s-BPDA was replaced with 4,4'-(hexafluoroisopropylidene)diphthalic anhydride (6FDA) and a portion of PDA was replaced with 2,2'-bis(4-aminocyclohexyl)-hexafluoropropane (6FDC), whereby a light-permeable resin substrate (a polyimide resin substrate including an optical element mounting portion having a thickness of 10 μm, a refractive index of 1.52, and a light permeability of 85% to a wavelength of 850 nm) was produced.

Then, an optical module was manufactured in the same manner as in Example 1 except that the aforementioned prepared light-permeable resin composition was used in place of the light-permeable resin composition (underfill) of Example 1 and that the aforementioned produced light-permeable resin substrate was used in place of the light-permeable resin substrate of Example 1.

Example 5

Pre-mixed were 00 parts by weight of an epoxy resin (OGSOL EG-200 available from Osaka Gas Chemicals Co., Ltd.) and 2 parts by weight of a photo-cation polymerization initiator (CPI-200K available from San-Apra Ltd.). Thereafter, the mixture was kneaded and melt-mixed in a kneading machine, and was then cooled to 23° C. In this manner, a light-permeable resin composition (underfill) was prepared which had a refractive index of 1.62 when cured into a cured material and which had a light permeability of 95% to a wavelength of 400 nm when the cured material thereof had a thickness of 100 μm.

In the composition of the light-permeable resin substrate of Example 1, the blending ratio of PDA to TFDB was increased, whereby a light-permeable resin substrate (a polyimide resin substrate including an optical element mounting portion having a thickness of 10 μm, a refractive index of 1.85, and a light permeability of 70% to a wavelength of 850 nm) was produced.

Then, an optical module was manufactured in the same manner as in Example 1 except that the aforementioned prepared light-permeable resin composition was used in place of the light-permeable resin composition (underfill) of Example 1 and that the aforementioned produced light-permeable resin substrate was used in place of the light-permeable resin substrate of Example 1.

Comparative Example 1

Pre-mixed were 100 parts by weight of a fluororesin (1,4-bis(2'3'-epoxypropyl)perfluoro-n-butane) available from Tosoh Finechem Corporation) and 2 parts by weight of a photo-cation polymerization initiator (CPI-200K available from San-Apro Ltd.). Thereafter, the mixture was kneaded and melt-mixed in a kneading machine, and was then cooled to 23° C. In this manner, a light-permeable resin composition (underfill) was prepared which had a refractive index of 1.35 when cured into a cured material and which had a light permeability of 95% to a wavelength of 400 nm when the cured material thereof had a thickness of 100 μm.

Then, an optical module was manufactured in the same manner as in Example 1 except that the aforementioned prepared light-permeable resin composition was used in place of the light-permeable resin composition (underfill) of Example 1.

Comparative Example 2

Figure 4:
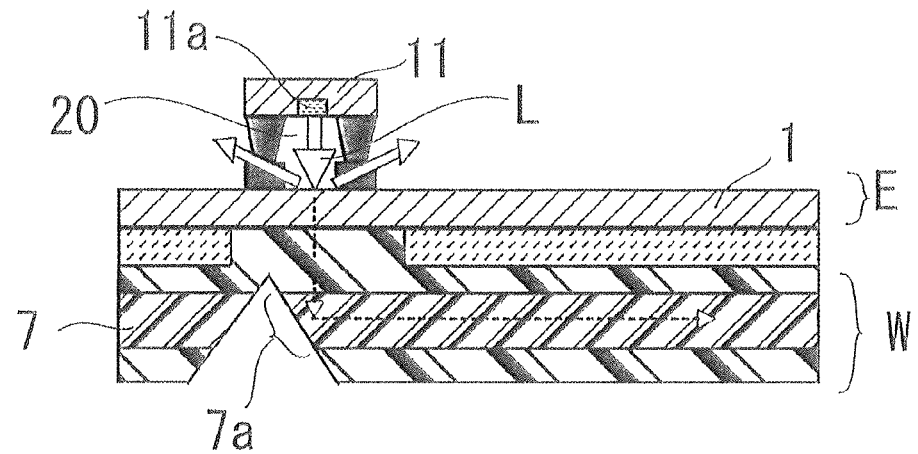
FIG. 4 is a vertical sectional view schematically showing an example of a related art optical module.

The underfilling was not performed, but a gap portion was left between the electric circuit board and the optical element (with reference to FIG. 4). Otherwise, an optical module was manufactured in the same manner as in Example 1.

<Relative Refractive Index Difference>

A relative refractive index difference represented by Equation (1) below was calculated and listed in TABLE 1 below.

<<Propagation Loss>>

Each of the aforementioned optical modules and an optical module produced in the same manner as each of the aforementioned optical modules except that a photodiode (PD) chip (a light-receiving area with a diameter of 40 μm) is mounted in place of the vertical cavity surface emitting laser (VCSEL) chip of each of the aforementioned optical modules were prepared. Next, the cores of the optical waveguides of both of the optical modules were connected to each other with a graded-index multimode optical fiber (GI50) having a core diameter of 50 μm. The intensity of light received by the PD chip when the emission intensity of the VCSEL chip was 1 W was determined by an optical simulation using simulation software (LightTools available from Cybernet Systems Co., Ltd.). In the aforementioned optical simulation, the effect of Fresnel reflection was considered only at an interface between the underfill and the light-permeable resin substrate and at an interface between an opto-electric hybrid board and the optical fiber for the sake of simplicity.

Then, a propagation loss was calculated by Equation (2) below from the emission intensity (W) of the VCSEL chip and the intensity (W) of light received by the PD chip.

$$\text{Propagation loss (dB)}=-10\times\log_{10}(\text{intensity of light received by } PD \text{ chip/emission intensity of VCSEL chip}) \qquad (2)$$

Based on the values of the propagation loss obtained by Equation (2), determination was made in reference to criteria to be described below.

○(very good): The propagation loss is less than 3.75 dB.

x (poor): The propagation loss is not less than 3.75 dB.

TABLE 1

| | Example 1 | Example 2 | Example 3 | Example 4 | Example 5 | Comp. Example 1 | Comp. Example 2 |
|---|---|---|---|---|---|---|---|
| Flexible printed circuit board material (refractive index) | Polyimide (1.73) | Polyimide (1.73) | Polyimide (1.52) | Polyimide (1.52) | Polyimide (1.85) | Polyimide (1.73) | Polyimide (1.73) |
| Underfill material (refractive index) | Epoxy resin (1.58) | Silicone resin (1.40) | Epoxy resin (1.58) | Epoxy resin (1.53) | Epoxy resin (1.62) | Fluororesin (1.35) | No material (1.0) |
| Relative refractive index difference (%) | 8.7 | 19.1 | 3.8 | 0.7 | 12.4 | 22.0 | 42.2 |
| Propagation loss [dB] | 3.62 | 3.74 | 3.62 | 3.63 | 3.64 | 3.77 | 4.42 |
| Determination | ○ | ○ | ○ | ○ | ○ | x | x |

$$\text{Relative refractive index difference}[\%]=[(n1-n2)/n1]\times100 \qquad (1)$$

where n1 is the higher one of the refractive index of the cured material of the light-permeable resin composition serving as the underfill and the refractive index of the light-permeable resin substrate of the electric circuit board, and n2 is the lower one thereof.

The properties of each of the optical modules thus manufactured in Examples and Comparative Examples were evaluated in accordance with criteria to be described below. The results were listed together in TABLE 1 below.

The results in TABLE 1 showed that the optical modules in the Examples were lower in propagation loss than the optical modules in the Comparative Examples to result in higher output efficiency than the optical modules in the Comparative Examples.

Although specific forms in the present disclosure have been described in the aforementioned examples, the aforementioned examples should be considered as merely illustrative and not restrictive to the scope of the present invention. It is contemplated that various modifications evident to those skilled in the art could be made without departing from the scope of the present disclosure.

The optical module of the present disclosure is, for example, usable as internal interconnect lines for electrical devices such as optical transceivers and AOCs (Active Optical Cables) based on optical communication interface standards such as QSFP (Quad Small Form-factor Pluggable) and OSFP (Octal Small Form Factor Pluggable), AOCs for consumer use, smartphones, tablets, and PCs (Personal Computers).

REFERENCE SIGNS LIST

E Electric circuit board
X Light-permeable resin cured material
1 Light-permeable resin substrate
11 Optical element
11a Light-emitting portion (or light-receiving portion
The invention claimed is:
1. An optical module comprising:
an electric circuit board comprising a light-permeable resin substrate and an electric circuit provided on a front surface of the light-permeable resin substrate; and
an optical element joined onto a front surface of the electric circuit board,
with a light-emitting or light-receiving portion of the optical element facing an electric circuit surface side of the electric circuit board, the optical element is joined to the electric circuit board via a bump,
wherein a space between the light-emitting or light-receiving portion of the optical element and the light-permeable resin substrate is filled with a light-permeable resin cured material so that the entire surface of the bump is covered with the light-permeable resin cured material,
wherein a relative refractive index difference between the light-permeable resin cured material and the light-permeable resin substrate is not greater than 20%,
wherein an optical waveguide is provided on a back surface of the light-permeable resin substrate opposite from a surface thereof to which the optical element is joined,

wherein the optical waveguide comprises a first cladding layer, a core, and a second cladding layer,
wherein a first end portion of the optical waveguide corresponding to the optical element is formed into a light reflecting surface, and
wherein the light-emitting portion or the light-receiving portion of the optical element is optically coupled to the core by using the light reflecting surface of the optical waveguide.

2. The optical module according to claim 1,
wherein the light-permeable resin cured material has a 400-nm light permeability of not less than 40% when the thickness thereof is 100 μm.

3. The optical module according to claim 1,
wherein the light-permeable resin cured material is made of a cured material of a thermosetting resin composition which is cured by heating at 100° C. for 3 hours.

4. The optical module according to claim 1,
wherein the light-permeable resin substrate is made of a polyimide resin.

5. The optical module according to claim 1,
wherein the light-permeable resin cured material comprises at least one resin selected from the group consisting of an epoxy resin, a silicone resin, an acrylic resin, and a urethane resin, and
wherein the light-permeable resin cured material optionally comprises a curing agent, a curing catalyst, a dyestuff, a modifying agent, a discoloration inhibitor, an anti-aging agent, a mold release agent, and a reactive or non-reactive diluent.

6. The optical module according to claim 1, wherein the curing agent is at least one selected from the group consisting of a heat curing agent, a photo-cation polymerization initiator, a photo-anion polymerization initiator, a radical initiator, and a moisture curing agent.

* * * * *